United States Patent

Boigenzahn et al.

[19]

[11] Patent Number: 5,872,678
[45] Date of Patent: *Feb. 16, 1999

[54] ENCLOSURE ASSEMBLY FOR A DISK WITH A LOCATIONAL AND RETENTION CAST DOCKET STRUCTURE FOR A CONNECTOR AND FLEXIBLE CABLE CONNECTED TO AN ELECTRONICS CARD

[75] Inventors: Jeffrey Fred Boigenzahn; Darrell Eugene Bratvold; Dale C. Goeke, all of Rochester; Michael S. Good, Byron; Dale E. Goodman, Oronoco; Richard E. Lagergren; Gregory A. Lyons, both of Rochester; Brian L. Rappel, Grand Meadow; James M. Rigotti, Rochester; Lyle R. Tufty, Elgin, all of Minn.

[73] Assignee: International Business Machines Corporation, Armonk, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 656,449

[22] Filed: May 31, 1996

Related U.S. Application Data

[63] Continuation of Ser. No. 445,926, May 22, 1995, which is a continuation of Ser. No. 25,639, Mar. 2, 1993, abandoned.

[51] Int. Cl.$^6$ .................................................. G11B 33/12
[52] U.S. Cl. ..................................... 360/97.01; 360/98.01
[58] Field of Search .............................. 360/97.01–99.12; 439/65–67, 77, 492, 499

[56] References Cited

U.S. PATENT DOCUMENTS

| | | | |
|---|---|---|---|
| 3,904,265 | 9/1975 | Hollyday et al. | 339/103 M |
| 4,211,466 | 7/1980 | Reynolds | 339/176 MF |
| 4,285,018 | 8/1981 | Mulvany et al. | 360/98 |
| 4,443,824 | 4/1984 | Frasier et al. | 360/104 |
| 4,457,576 | 7/1984 | Cosmos et al. | 339/143 R |
| 4,476,404 | 10/1984 | Bygdnes | 310/27 |

(List continued on next page.)

FOREIGN PATENT DOCUMENTS

| | | | |
|---|---|---|---|
| 233059 | 11/1959 | Australia | 439/695 |
| 5933683 | 2/1984 | Japan . | |
| 2165482 | 6/1990 | Japan . | |
| 1590478 | 6/1981 | United Kingdom | 439/559 |

OTHER PUBLICATIONS

IBM Technical Disclosure Bulletin, "Connector–Shielded Cable," vol. 9, No. 1, Mar. 1967, p. 1298.
IBM Technical Disclosure Bulletin, "Retainer Insert for Connector Docking," vol. 33, No. 6A, Nov. 1990, pp. 474–476.
IBM Technical Disclosure Bulletin, "Clam Shell Structure for 2–1/2–Inch Hard Disk Drive," vol. 33, No. 9, Feb. 1991, pp. 349–350.
IBM Technical Disclosure Bulletin, "Connector Lubricating Seal," vol. 35, No. 1B Jun. 1992, pp. 122–123.

*Primary Examiner*—William J. Klimowicz
*Attorney, Agent, or Firm*—Joan Pennington; Roy W. Truelson

[57] ABSTRACT

A data storage disk drive is provided with a spindle which supports at least one disk having at least one magnetic disk surface to form a spindle assembly for rotation of the disk surfaces about a common axis and a rotary actuator which supports at least one magnetic tranducers for movement about respective disk surfaces. The enclosure includes a base casting and a cover casting. The base casting include predetermined registration surfaces for mounting the spindle and the rotary actuator and having a mating face. The cover casting has a mating face for engaging the base mating face to define the disk drive enclosure for enclosing the spindle, the at least one disk surface, the at least one magnetic transducer and the actuator. The mating faces extend along the length of the disk drive enclosure. The base casting including a locational and retention cast pocket structure for locating and retaining electrical connector and a flexible cable used for connecting to a planar electronics card located outside the drive enclosure.

10 Claims, 8 Drawing Sheets

U.S. PATENT DOCUMENTS

| | | | |
|---|---|---|---|
| 4,477,142 | 10/1984 | Cooper et al. | 339/128 R |
| 4,567,546 | 1/1986 | Zeller et al. | 361/420 |
| 4,761,145 | 8/1988 | Goto et al. | 439/469 |
| 4,780,090 | 10/1988 | Sugiyama et al. | 439/247 |
| 4,813,885 | 3/1989 | Colleran et al. | 439/565 |
| 4,908,715 | 3/1990 | Krum et al. | 360/97.02 |
| 4,923,406 | 5/1990 | Bucknam | 439/77 |
| 4,943,693 | 7/1990 | Wang et al. | 200/304 |
| 4,965,684 | 10/1990 | Stefansky | 360/78.12 |
| 4,985,793 | 1/1991 | Anderson | 360/105 |
| 5,245,486 | 9/1993 | Hachiya | 360/97.01 |
| 5,282,099 | 1/1994 | Kawagoe et al. | 360/97.01 |
| 5,295,027 | 3/1994 | Elsing et al. | 360/97.01 |
| 5,337,202 | 8/1994 | Jabbarai et al. | 360/97.01 |
| 5,357,386 | 10/1994 | Haidari et al. | 360/97.02 |
| 5,508,860 | 4/1996 | Takagi et al. . | |
| 5,543,982 | 8/1996 | Takagi et al. | 360/97.01 |

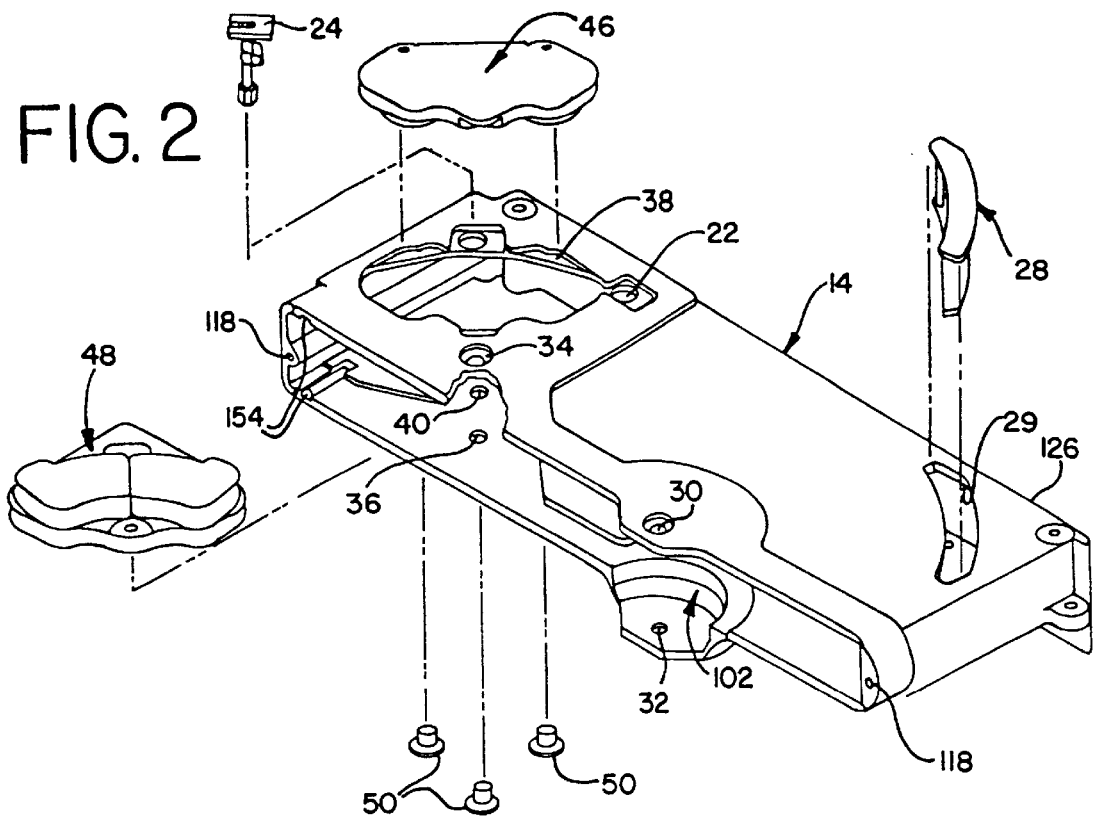
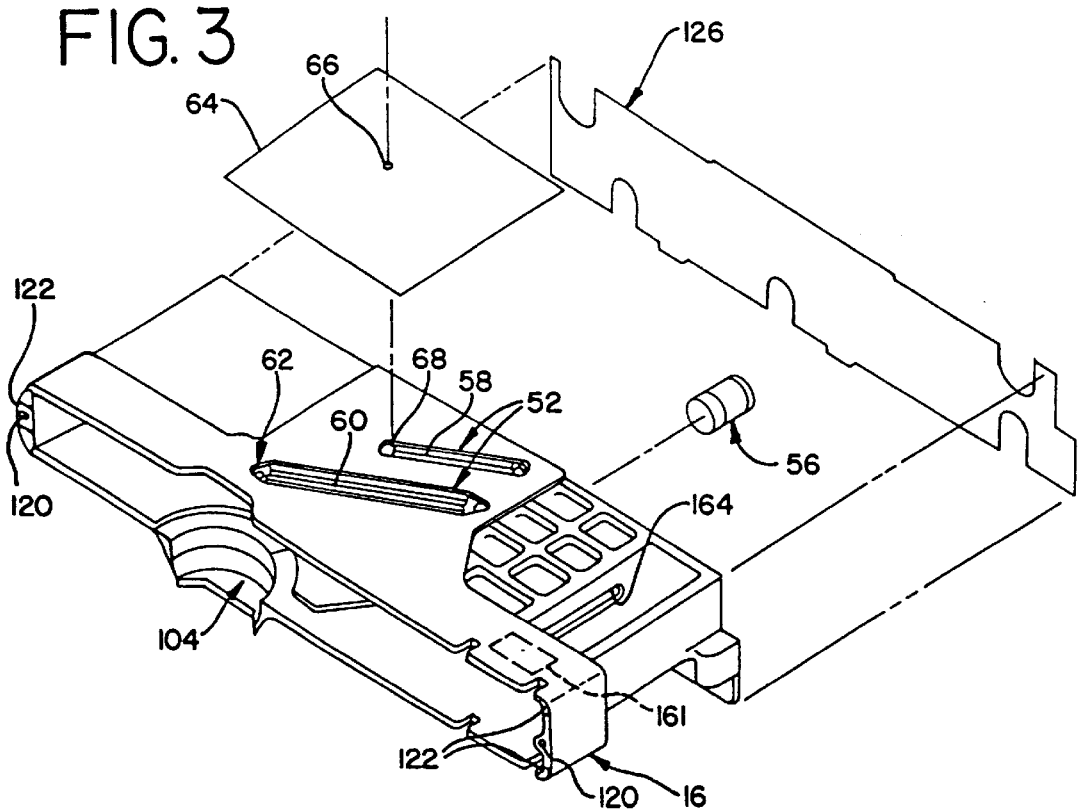

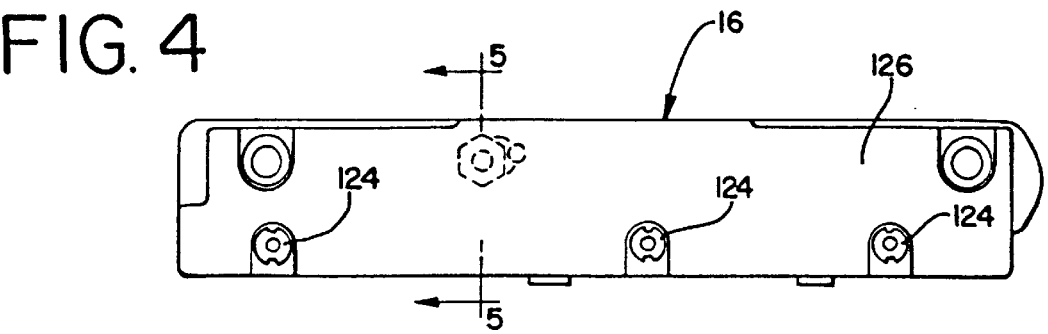
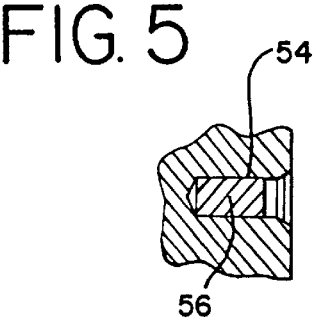
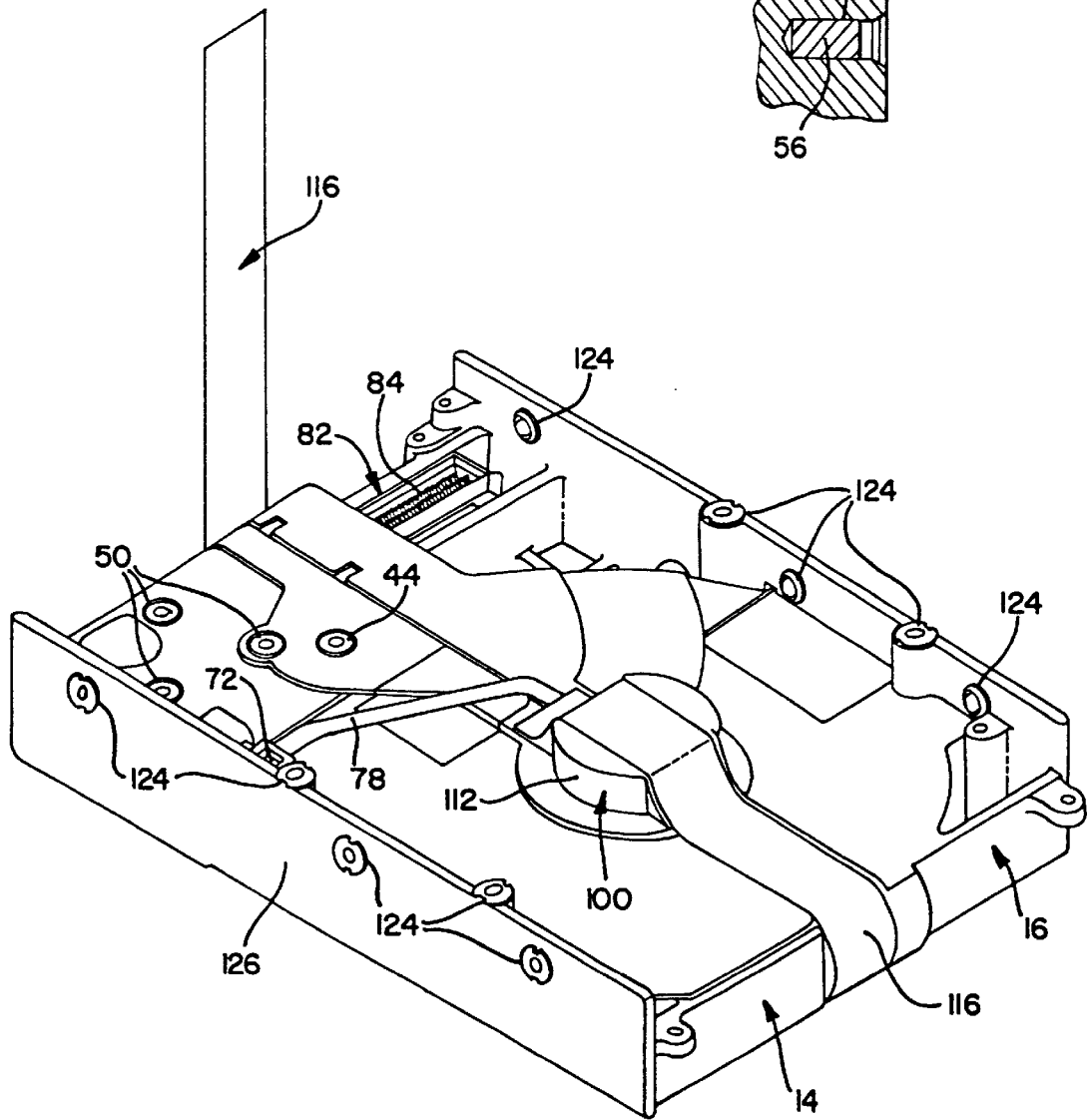

ENCLOSURE ASSEMBLY FOR A DISK WITH A LOCATIONAL AND RETENTION CAST DOCKET STRUCTURE FOR A CONNECTOR AND FLEXIBLE CABLE CONNECTED TO AN ELECTRONICS CARD

This is a continuing application of application Ser. No. 08/445,926, filed May 22, 1995 which is a continuation of application Ser. No. 08/025,639, filed Mar. 2, 1993, now abandoned.

BACKGROUND OF THE INVENTION

1. Field of the Invention

The present invention relates to a direct access storage device (DASD) and, more particularly, to improved electrical and mechanical structures and arrangements and enclosure assembly for a high performance small form-factor disk drive.

2. Description of the Prior Art

Computers often include auxiliary memory storage units having media on which data can be written and from which data can be read for later use. Disk drives incorporating stacked, commonly rotated rigid magnetic disks are used for storage of data in magnetic form on the disk surfaces. Data is recorded in radially spaced data information tracks arrayed on the surfaces of the disks. Transducer heads driven in a path toward and away from the drive axis write data to the disks and read data from the disks.

Disk drive dimensions are normally limited by a form factor, an industry standard of length, width and height dimensions. As disk drive device form factors become increasingly smaller, electrical connections to the using system can utilize an increasingly greater portion of the device form factor. In addition, the device interface and power connectors used, and the placement of these connectors within the device form factor results in industry standard elements. The resulting rigid industry standards provide significant geometric constraints on future models of a given product family or set.

Historically in small DASD's, 5¼" and smaller, a disk drive enclosure for a head/disk assembly (HDA) is fitted into a metal frame commonly called a user frame. This user frame is typically an aluminum die casting or formed from a sheet metal stamping. Generally, an HDA is attached to the user frame via three or four resilient vibration isolators or shock mounts. For these isolators to be effective, space is required between the HDA and the user frame to allow the HDA to move freely in response to external vibration or shocks. Threaded holes are provided at standard locations in the right and left sides and the bottom of the user frame for attaching the disk drive assembly to the using system box. Therefore, the user frame becomes firmly mounted to the using system box, but the HDA is both electrically and mechanically isolated via the vibration/shock isolators. When magneto-resistive (MR) heads are used within a file, electrical isolation is required between the HDA and the user frame. With smaller form factor disk drives, space constraints also restrict the use of resilient vibration isolators or shock mounts.

Other basic problems in a small form factor disk drive include space for electronics and the cost. When magneto-resistive (MR) heads are used within a file, a very low amplitude signal is provided so that amplification is required as early as possible in the electrical path to prevent picking up unwanted noise or causing signal degradation. The required amplifier circuits in the data channel, implemented by an integrated circuit, require external capacitors for tuning and noise filtering. With a small form factor, the surface area on the actuator available for supporting required arm electronics is limited. In known arrangements, components are mounted on a flex cable father away from the actuator. This conventional arrangement would adversely impact performance with the MR heads. Other known arrangements use expensive multi-layer ceramic or flex packaging to allow buried lines and vias. A need exists for a cost-effective, efficient and reliable packaging arrangement for arm electronics.

When magneto-resistive (MR) heads are used within a file, transducers and disks must be held at the same electrical potential. Known small form factor disk drives have provided a conductive path from the flex circuit to an actuator comb through a mounting screw. A need exists to provide a low cost manufacturable electrical path from the flex circuit to the comb.

Typically, electrical connectors have been registered in place by potting or gluing them into holes of the base casting plates. These approaches require a slow labor-intensive process in a clean room assembly to secure and seal the opening around the connector or require an additional connector on the inside of the disk enclosure. Often a data cable exits the disk enclosure to transmit read/write head signals to a card assembly on the outside of the disk enclosure. Typically the data cable extends along a smooth surface of the base and is squeezed between the surface and a rubber gasket. Extending from the device enclosure is a dangling data cable that is a source of damage during assembly and that does not lend itself well to automated assembly.

The spindle motor assembly is driven by signals from a card assembly on the outside of the disk enclosure. Typically a flex cable is used to carry signals to the spindle motor. This assembly process also is difficult to automate and susceptible to damage during assembly.

A mechanically stable enclosure structure is required for the disk drive. Mounting surfaces for spindle shafts, actuator shafts and actuator pole-pieces have normally been generated by a machining process for the disk enclosure (DE). The machining process is time consuming and expensive.

Magnetic disk drive assemblies require make-up air to compensate for small, slow leaks in the enclosure, and to adjust to environmental temperature and pressure changes. The components inside the drive are very sensitive to contaminants that can be easily introduced by an incoming air stream. These contaminants include small particles, organic vapors and inorganic gases containing ionic acids. All of these components may be present in the surrounding ambient air from which the make-up air is drawn.

Traditional filters have concentrated primarily on capturing particulates from the incoming make-up air. However, more recent designs have incorporated elements to remove the other components. The addition of filter elements for organics and inorganics requires additional space which becomes increasingly difficult to find as disk drive enclosures become smaller. The filter functions become separated into several stages, which are combined together either on top of, or alongside, one another.

Disk drive designs often incorporate a breather port to relieve pressure differentials and provide a controlled source of make-up air in the event of leakage. Breather filters provide filtration for particulates and, increasingly, for environmental chemicals such as plasticizers and corrodents. These filters commonly contain a high efficiency particulate air (HEPA) filter medium to remove particles from the air passing into the drive through the breather. A typical target efficiency for this media is 99.97% of particle ≧0.3 micron. A breather filter is designed to be the preferred point of entry of air into the drive and thus must have a low pressure drop; a typical specification is 0.1 in. of water at 30 cc/min. The relatively high pressure drop of HEPA media requires that a relatively large area be employed. The diameter for the media disk for small drive breather filters is commonly 10–25 mm. HEPA media used in such filters are either micro-fiber glass or expanded PTFE. Typical thickness of these is ≦0.5 mm. For chemical cleansing of the air entering the file, a layer of permeable chemically active media is placed in the breather directly upstream of the HEPA medium.

One known breather filter design disclosed in U.S. Pat. No. 5,030,260 has shown that the airflow path through the filter has a very significant impact on the performance and capacity of the elements which remove organics and acids. In that design, the geometry required to impart the proper airflow through the filter positioned the upstream and downstream diffusion paths alongside the filter chamber. This added greatly to the overall size of the filter. It also required a relatively large flat area for mounting.

SUMMARY OF THE INVENTION

It is a principal object of the present invention to provide a high performance disk drive that overcomes many of the disadvantages of prior art arrangements. Other important objects of the invention are to provide a disk drive enclosure incorporating structure for locating and retaining electrical connectors used for connecting to a planar electronics card located outside the drive enclosure; to provide a disk drive including a unitary member for containing and positioning a data cable relative to a base enclosure and for sealing an interface between a data cable connector and a cover enclosure; to provide a disk drive including a connector retainer for retaining and securing a power connector to a base enclosure; and to provide such a disk drive substantially without negative effects.

In brief, the objects and advantages of the present invention are achieved by a data storage disk drive having a spindle which supports at least one disk having at least one magnetic disk surface to form a spindle assembly for rotation of the disk surfaces about a common axis and a rotary actuator which supports at least one magnetic transducer for movement about respective disk surfaces. The enclosure includes a base casting and a cover casting. The base casting includes predetermined registration surfaces for mounting the spindle and the rotary actuator and having a mating face. The cover casting has a mating face for engaging the base mating face to define the disk drive enclosure for enclosing the spindle, the at least one disk surface, the at least one magnetic transducer and the actuator. The mating faces extend along the length of the disk drive enclosure. The base casting including a locational and retention cast pocket structure for locating and retaining electrical connector and a flexible cable used for connecting to a planar electronics card located outside the drive enclosure.

BRIEF DESCRIPTION OF THE DRAWING

The present invention, together with the above and other objects and advantages, can best be understood from the following detailed description of the embodiment of the invention illustrated in the drawing, wherein:

FIG. 2 is an exploded perspective view of a base casting and a pole-piece magnet assembly of the disk drive of FIG. 1;

FIG. 3 is an exploded perspective view of a cover subassembly and filter arrangement of the disk drive of FIG. 1;

FIG. 4 is a side view of the cover subassembly of the disk drive of FIG. 1;

FIG. 5 is a fragmentary sectional view taken along the line 5—5 of FIG. 4;

FIG. 6 is a bottom perspective view of the disk drive of FIG. 1;

DETAILED DESCRIPTION OF THE PREFERRED EMBODIMENTS

Figure 1:
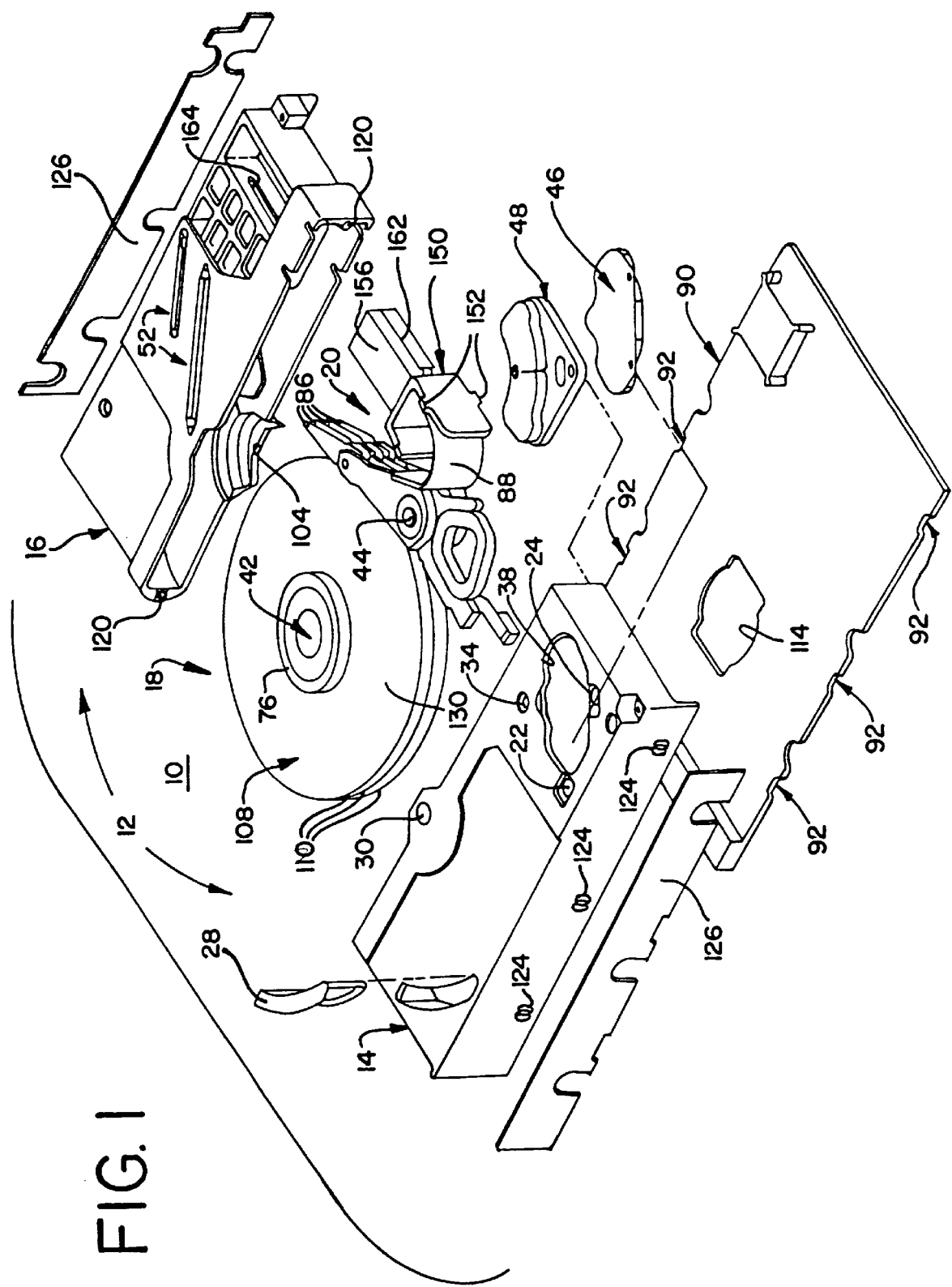
FIG. 1 is an exploded perspective view of a high performance disk drive of the invention.

Referring now to FIG. 1 of the drawing, there is shown an exploded perspective view of a high performance disk drive unit designated as a whole by the reference character 10 and constructed in accordance with principles of the present invention. Disk drive 10 includes an enclosure structure 12 produced by two mating aluminum die castings 14 and 16 which meet along the length of the device form factor. These are referred to as a base casting 14 and a cover casting 16, respectively.

Base casting 14 houses all functional elements of the device enclosure 12, including a spindle/motor assembly 18 and the actuator assembly 20. In addition, an outer diameter (OD) crash-stop 22, an inner diameter (ID) crash-stop/ homelatch 24, and a recirculation filter 28 reside within the base casting 14. Recirculation filter 28 is received within base casting opening 29 for filtering the enclosed air volume with the disk drive 10. The physical design is such that the actuator assembly 20 or spindle/motor assembly 18 may be installed or removed from the enclosure independently of one another and in any preferred sequence for assembly or rework purposes.

It should be noted that disk drive 10 is arranged so that the need for utilizing the entire form-factor length for the structural enclosure 12 for the product is eliminated. Disk drive 10 involves reducing the centerline distance between the disk spindle and the rotational axis of the actuator system, reducing the diameter of the bearing system employed for the actuator, and changing the skew-angle/gap radius of the actuator system to allow full utilization of the disk surfaces.

Referring also to FIG. 2, unique features associated with the base casting 14 include zero-draft regions providing very precise registration surfaces, generally designated as 30, 32, 34, 36, 38 and 40, generated in the die-casting process. Each end of a spindle motor shaft, generally designated as 42, is received by the registration surfaces 30, 32 and secured to the base 14. Registration surfaces 34 and 36 mount an actuator bearing cartridge shaft 44. Registration surfaces 38 and 40 provide mounting pads for an upper VCM pole-piece magnet assembly 46 and a lower VCM pole-piece magnet assembly 48, respectively. The upper VCM pole-piece magnet assembly 46 is secured to the base casting 14 by an adhesive. The lower VCM pole-piece magnet assembly 48 is attached to the base by a series of bolts 50.

This unique feature of the invention eliminates the need to produce the registration surfaces through the process of machining and subsequent deburring activities, as has been the practice on all known prior disk drive products of this type. Use of the die-casting process to generate the registration surfaces 30, 32, 34, 36, 38 and 40 reduces the cost of machining.

Base casting 14 is configured as one half of the enclosure structure 12 for housing all functional elements of the device 10 to provide the greatest possible dimensional stability for the critical operational parameters, since the number of joints subject to displacement and distortion are minimized. This also ensures the best possible performance under changing thermal and vibrational conditions of the device 10.

Referring also to FIGS. 3–5 and 17, unique features of the cover casting 16 include a perforated rib structure generally designated 52 formed above high-power electrical modules to facilitate air-flow and convective heat transfer to the airstream. A cast or machined cavity 54 serves as an integral housing for a breather filter 56 illustrated and described with respect to FIGS. 14–17 and an alternative arrangement with respect to FIGS. 18–24. The cast or machined cavity 54 eliminates the need for a separate conventional breather filter housing, such as some form of plastic casing, thereby eliminating unnecessary product expense. Breather filter media 56 can be stuffed into cavity 54 in the cover casting 16 without need to fasten or bond any additional housed elements into place.

An integral diffusion path 58 is cast in the cover casting 16 for controlling the flow of air, indicated by arrows 52A, into the breather-filter 56. An integral channel 60 of controlled cross-sectional area is also incorporated into the die-casting of the cover casting 16 to regulate and direct the airstream, indicated by arrows 52B, from the breather-filter 56 to a low-pressure region indicated generally by 62 (FIG. 3) near the center of the rotating spindle system 18. A film 64 covering channels 58 and 60 includes an air inlet hole 66 aligned with an inlet to channel 58. By incorporating the integral diffusion path 58 in the cast geometry, the need to produce those features in a separate component secured to the device is eliminated. The configuration of channel 60 ensures that the point of lowest pressure of the file 10 is employed to draw air through the breather filter 56 which provides the needed particulate and chemical treatment of the airstream for all air drawn into the device, and greatly reduces the potential for air to be drawn into the disk drive 10 through any alternate path of fenestration.

Figure 8:
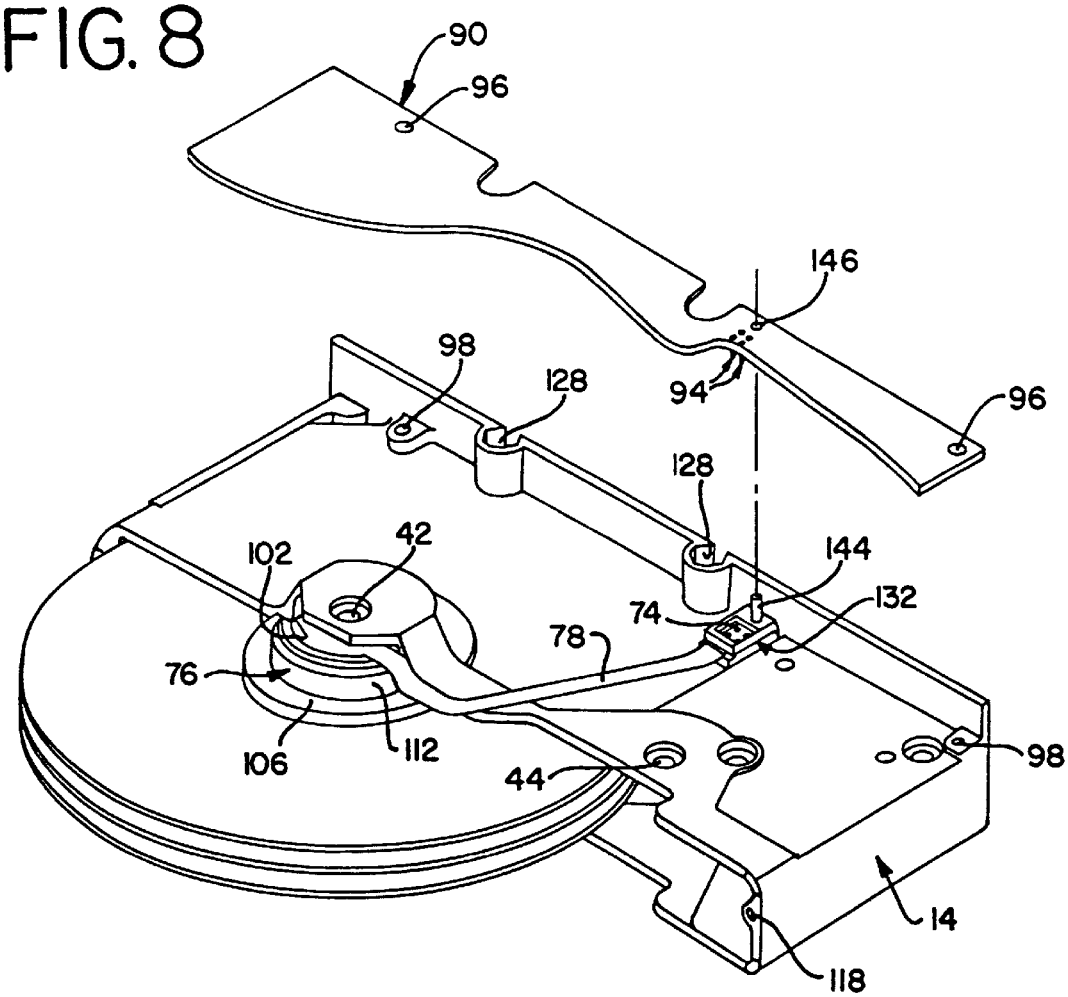
FIG. 8 is an exploded perspective view of the spindle motor connector retainer assembly together with a card assembly of the high performance disk drive of FIG. 1.

Referring now to FIGS. 1, 6 and 8, base casting 14 provides a locational and retention structure generally designated 72 for an electrical connector 74 connected to a spindle motor 76 via a flex cable 78. Cover casting 16 provides a locational and retention structure generally designated by 82 for an electrical data or actuator flex cable connector 84 for multiple read/write transducers or heads 86 via a flex cable 88. These functions greatly simplify the manufacturing process of installing or removing from the device 10 a set of electronics carried by a planar card 90 (FIG. 1), since it is not necessary for the assembler to grasp or otherwise handle electrical connectors during the process. Having reference to FIG. 8, a portion of the electronics card 90 is shown with the base casting 14. To install the electronics card 90, the card 90 is aligned with the assistance of guide features 92 incorporated in the card 90 and then the card 90 is pushed down into position, with necessary electrical connections made to the motor connector 74 housed in the base casting 14 via terminal pins 94. Necessary electrical connections similarly are made to the actuator flex cable connector 84 housed in the cover casting 16. The electronic card is secured in place to the base 14 with a set of screws (not shown) received through aligned apertures 96 and 98 in the card 90 and base 14.

The base casting 14 and the cover casting 16 are contoured to provide a localized well generally designated 100 by corresponding regions 102 and 104. Localized well 100 accommodates additional height requirements associated with the spindle motor assembly 18. As best seen in FIGS. 1 and 6–8, the spindle motor 76 includes a flange 106 for supporting a stack 108 of disks 110 and a lower portion 112 below the flange 106 extending within the localized well 100. The localized well 100, defined by regions 102 and 104, is located and minimized in size to minimize the areal reduction available to the planar electronics card 90, and also provides a ribbed stiffening effect in the region of the spindle system 18, which further enhances the dimensional stability of this critical region. An aperture 114 is provided in the card 90 corresponding to the localized well 100.

Localized well 100 has a bell geometry to facilitate sealing of the disk enclosure 12 which is further provided by a copper-film tape 116 encircling the disk enclosure 12 around the length of the enclosure at the mating line between the two castings 14 and 16 as shown in FIG. 6. The two mating castings 14 and 16 are registered and secured together by two fasteners (not shown) received through corresponding apertures 118 and 120 in the base and cover castings 14 and 16. The fastener receiving apertures 118 and 120 are located at each end of the enclosure length to draw the halves together against a set of three matching pads generally designated 122. The three-point system 122 minimizes distortion effects imposed on the mating halves 14 and 16 when the fasteners are tightened, which could create assembly stresses in the assembly. Assembly stresses can contribute to performance degradation during file operations and often lead to production yield problems and customer quality problems.

Both castings 14 and 16 incorporate localized contouring to accommodate geometric spacing requirements for the mating electronics board 90 to provide optimal use of the device spatial envelope for functional components of the disk drive 10 both internally and externally to the disk enclosure 12.

Both castings 14 and 16 are configured as five-sided elements, with the open face representing the mating surface between the two halves. This configuration results in a greater structural stability and integrity than is associated with place, tube or box designs due to the reinforcing nature of the five-sided box design and the lack of joints between the mounting/registration surfaces to which critical functional assemblies 18 and 20 of the device are secured.

Referring to FIGS. 1, 3, 6 and 8, a unique electrical isolation system is achieved for the two castings 14 and 16 using a series of ten identical inserts 124 and a pair of insulating members or insulators 126. Inserts 124 are simply pressed into a series of corresponding cavities 128 formed of the castings 14 and 16. Inserts 124 are formed of an engineering plastic material, such as Ultem. Disk drive 10 is not shock-mounted which is achievable by the rotary actuator system 20 nominally produced with a static balance about the axis of rotation. Disk drive 10 is desensitized to externally applied inputs which would otherwise result in relative motion between the read/write gap of the magnetic recording heads 86 and data tracks which are created on the disk surfaces 130.

Figure 7:
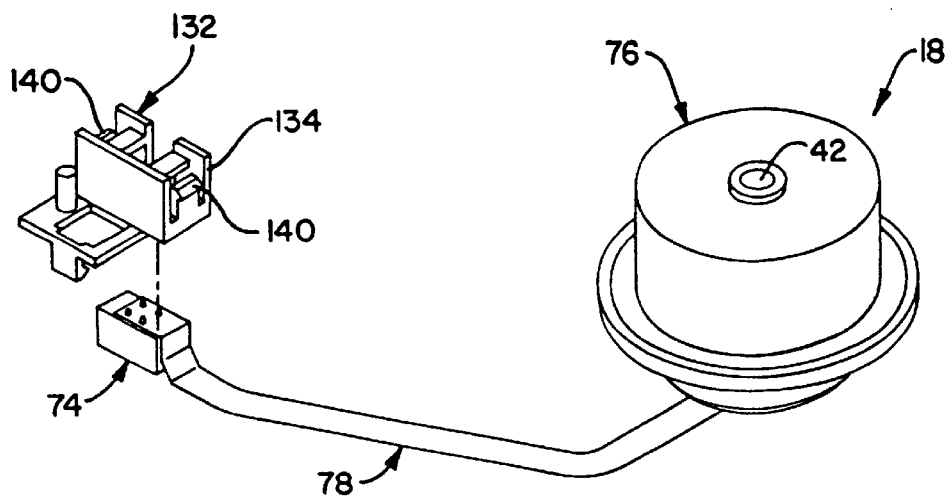
FIG. 7 is an enlarged exploded perspective view of a spindle motor connector retainer assembly of the high performance disk drive of FIG. 1.
Figure 9:
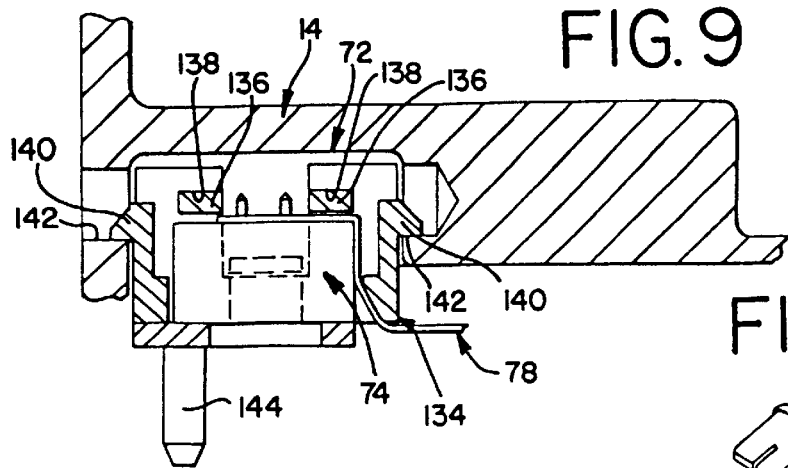
FIG. 9 is a fragmentary sectional view illustrating a spindle motor connector retainer assembly mounted in a pocket cast into a base of the high performance disk drive of FIG. 1.
Figure 10:
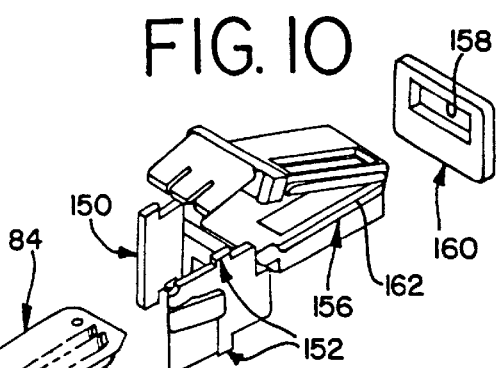
FIG. 10 is a perspective view of a preferred data cable guide and seal assembly of the high performance disk drive of FIG. 1.

Referring to FIGS. 7–9, a connector retainer generally designated as 132, formed of electrically insulative material such as nylon, holds and secures the spindle motor connector 74 and flex cable 78 to the base casting 14 and locates the motor connector 74 to the card assembly 90. Connector retainer 132 is a one-piece box including a hinged lid portion designated 134 initially located as shown in FIG. 7. After the motor connector 74 and flex cable 78 are inserted into the retainer 132, the hinged lid 134 is swung over the connector 74 where a snap 136 on the lid fits into a slot 138 to retain the connector. When the spindle motor assembly 18 is attached to the base casting 14, the retainer 132 holding the connector 74 and flex cable 78 is slidingly inserted into the pocket 72 cast into the base 14. Retaining features or snaps 140 on both ends of the retainer 132 fit into recesses 142 in the pocket walls, securing the retainer. The card assembly 90 can be attached by slidingly engaging a locating post 144 of the retainer 132 into an aperture 146 the card 90, aligning the card pins 94 to the motor connector 74 and creating a positive connection. With this process manual plugging and unplugging of the motor connector 74 to the card assembly 90 is eliminated.

Referring to FIGS. 1, 3, 6 and 10, there is shown a data cable guide and seal bracket generally designated 150 arranged in accordance with the invention. Data cable guide and seal bracket 150 is a formed nylon block that contains and positions the flex cable 88 and data connector 84 onto the base casting. Bracket 150 is a one-piece folding part that locates the data cable 88 in relationship to the card connector 84. Bracket 150 includes a positioning rail 152 received within a pair of slots 154 formed in the base casting 14, as shown in FIG. 2. Bracket 150 includes a forwardly extending portion 156 that extends through an aperture 158 within a seal 160 and corresponding aligned hole 161 in the cover casting 16, shown in dotted line in FIG. 3, and provides a sealing surface with the cover casting 16. Bracket portion 156 defines a pair of positioning rails 162 received within a pair of guide slots 164 (one shown) formed in the cast cover 16. When the actuator assembly 18 is assembled into the base casting 14, the bracket 150 is secured to the base casting 14 via the cast slot 154 so that the cover casting 16 can be assembled directly to the base with the bracket 150 positioning itself into the cover casting 16. When the cover casting 16 is assembled with the base casting 14 as shown in FIG. 6, the flex cable 88 and connector 84 are held in a position with the connector 84 presented to the card 90. The seal edge, feedthrough hole 161 and guide slots 164 are die-cast features of the cover casting 16 provided by the die-casting process without adding any additional operations or cost. It should be noted that bracket 150 eliminates the dangling flex of disk drive conventional arrangements.

Figure 11:
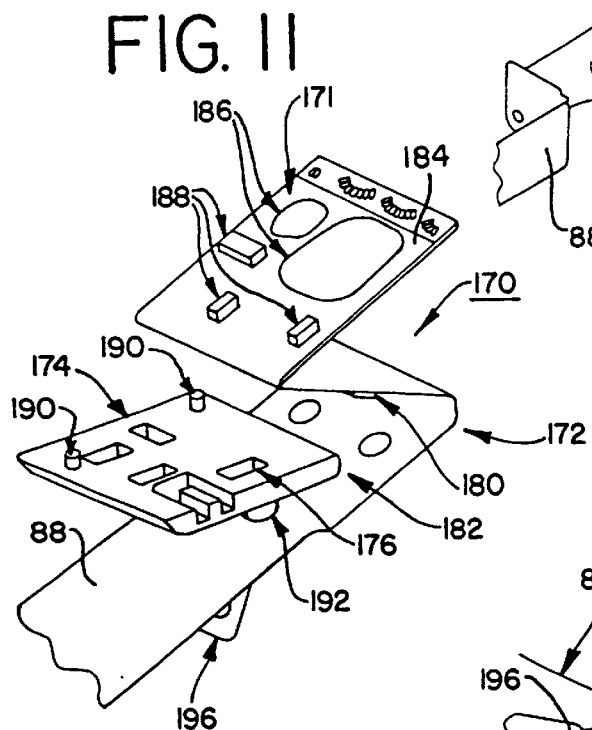
FIG. 11 is an exploded perspective view of a triple fold dynamic flex cable for mounting arm electronics of the high performance disk drive of FIG. 1.
Figure 12:
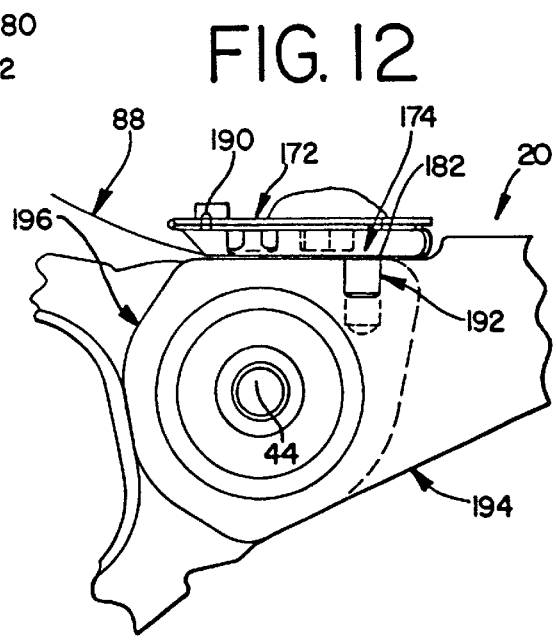
FIG. 12 is a fragmentary side view illustrating the triple fold dynamic flex cable with an actuator assembly of the high performance disk drive of FIG. 1.

Referring to FIGS. 11 and 12, there is shown a support arrangement generally designated 170 for supporting an arm electronics (AE) generally designated 171. Additional surface area for mounting components of the AE 171 is provided on the actuator assembly 20 by folding the flex cable 88 to form an S-shape generally designated 172 as shown in FIG. 12 and using a molded wafer 174 to provide a series of cavities 176 for receiving a plurality of capacitors 180 and providing a flat surface 182 of the flex S-shaped support 170 to mount to the actuator 20.

A top surface 184 of the flex S-shaped support 170 is used to mount the most critical components including two integrated circuit devices 186 using direct chip attach (DCA) wirebonding and encapsulation techniques, along with the three most critical noise filter capacitors 188. The inner layer is used to mount the remaining five capacitors 180. Wafer 174, formed of an engineering plastic material such as Ultem, includes a pair of upper locating pins 190 and a lower locating pin 192 for positioning the flex S-shaped support 170 with an actuator comb 194, to small tolerances, such as, for example, to +/−0.02 mm. The bottom layer of flex S-shaped support 170 includes a VCM tail 196 that allows attachment of the VCM coil and the voltage bias reference potential of 1.9 volts.

Actuator manufacturing is simplified since no screws are required to hold the flex. The locating pins 190 and 192 allow the use of a pressure-sensitive adhesive (PSA) to attach the flex S-shaped support 170 to the comb 194. The locating pins 190 and 192 provide the locating control and prevent the typical PSA creep that can occur under conditions of elevated temperature and continued biasing forces.

The flex S-shaped support 170 provides flex to comb thermal isolation. As the track density increases, track misregistration (TMR) becomes increasingly critical. The folded package isolates heat from the data arm electronics (AE) 180, 186 and 188 from the actuator comb 194 and prevents thermal changes from causing actuator arm movement and heat from affecting the comb. Power dissipated by the AE module during the write mode would cause repeated thermal swings if a direct thermal path from the AE to the comb existed. The flex S-shaped support 170 avoids this significant problem.

Figure 13:
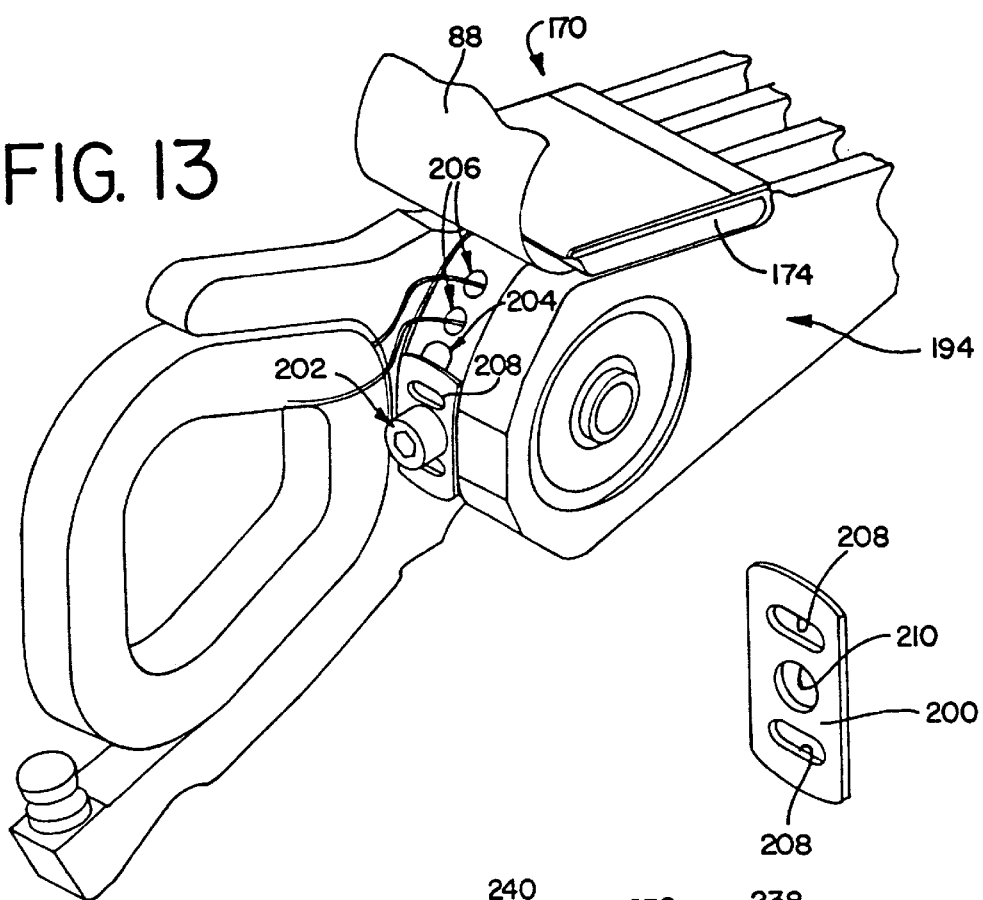
FIG. 13 is a fragmentary exploded perspective view illustrating a voltage reference tab removed from and assembled with the actuator assembly of the high performance disk drive of FIG. 1.

Referring to FIG. 13, there is shown a voltage reference tab removed from and assembled with the actuator assembly 20 of the high performance disk drive 10. Transducers or read/write heads 86 are magneto-resistive, requiring that the head 86 and the disk 110 be held at the same electrical potential. The actuator comb 194 is held to the reference voltage through the flex AE circuit 171.

Reference tab 200 is a small copper tab plated with a tin-lead alloy and placed under a bearing attach screw 202. In the actuator assembly process a portion of the flex circuit 171 with an exposed solder pad 204 is placed under the tab 200. The tab 200 is bent down onto the solder pad 204 and solder is added to complete the circuit when coil leads 206 are soldered.

Reference tab 200 is thin, for example, 0.3 mm and includes a slot 208 stamped at the bend location to facilitate the bending operation and to reduce the rate at which heat is conducted from the tip during the soldering process. Reference tab 200 is symmetric about a mounting hole 210 to facilitate the process of placing it under the bearing attach screw 202.

Referring to FIGS. 14–17, the illustrated filter 56 incorporates features required for efficient removal of all contaminants in the make up airstream in a compact shape which can easily be implemented on disk drives with small form factors below 5.25". The production of the filter 56 can be easily automated, leading to lower costs. An electrostatic filter media which is commercially available from a number of different sources is used.

Figure 14:
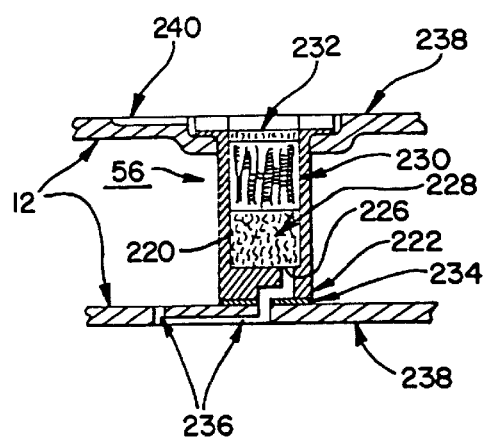
FIG. 14 is a sectional view illustrating an alternative tube breather filter.

In FIG. 14 a cross-section of a possible implementation of the body of the filter 56 is shown with a simple tube structure 220 and various layers of media stuffed in the tube. Filter housing 54 advantageously is formed within the cover casting 16 as shown in FIG. 17. However, tube structure 220 also could be a simple molded polycarbonate part, with a partially closed end 222 to support the filter media. In this case, the bottom of the tube contains three small holes 224 that interconnect at the bottom end of the tube 220 providing the outlet of the filter, for example as shown in FIG. 16.

The filter is assembled by first placing a scrim 226 at the bottom of the tube. Scrim 226 is followed by a piece of electrostatic filter media generally designated 228. The electrostatic filter media 228 is commercially available from multiple suppliers. Desirable characteristics of the electrostatic filter media 228 include a pressure drop at least one order of magnitude lower than for the high efficiency membrane medias, that media 228 self-seals inside the tube from packing, and its filtration efficiency is on the same order as the high efficiency membrane medias when used in this application. Next a treated carbon element 230 is inserted to satisfy organic and inorganic filtration requirements. Treated carbon element 230 could be a Kynol fabric treated with sodium carbonate, a treated Kynol felt or yarn, or a treated carbon-loaded polyurethane foam, such as a foam media currently produced by Lewcott Corp. Potassium carbonate treatment could be used instead of sodium carbonate to achieve a similar result for the treated carbon element 230. An optional piece of electrostatic media 232 could be placed at the top of the tube to act as a prefilter.

The tube concept of filter 56 allows for the use of thicker medias in a breather filter assembly. Because of the low pressure drop across this media, small diameter filter assemblies are possible. For example, the filter illustrated in FIG. 14 has a tube OD of 8 mm, a footprint of 0.5 square cm and fits in a 15 mm tall disk enclosure. Testing on prototype filters has confirmed that high efficiency particulate filtration is possible of greater than 99.995 % efficient at over 100 times the design flow rate. Effective organic and inorganic filtration efficiency and capacity can be achieved in this small package and at low cost with the proper selection of treated carbon media.

Figure 15:
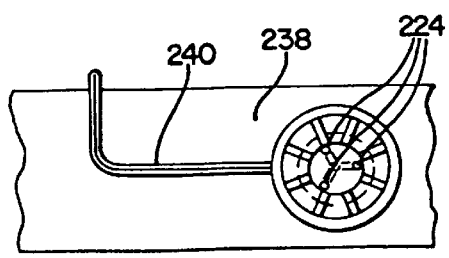
FIGS. 15 and 16 are top and bottom plan views, respectively, illustrating diffusion paths of the breather filter of FIG. 14.
Figure 16:
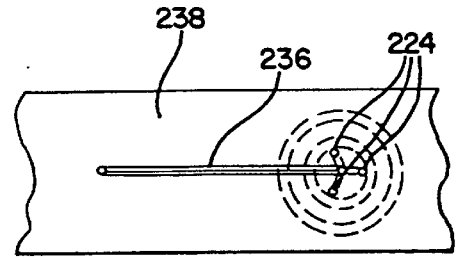
Figure 17:
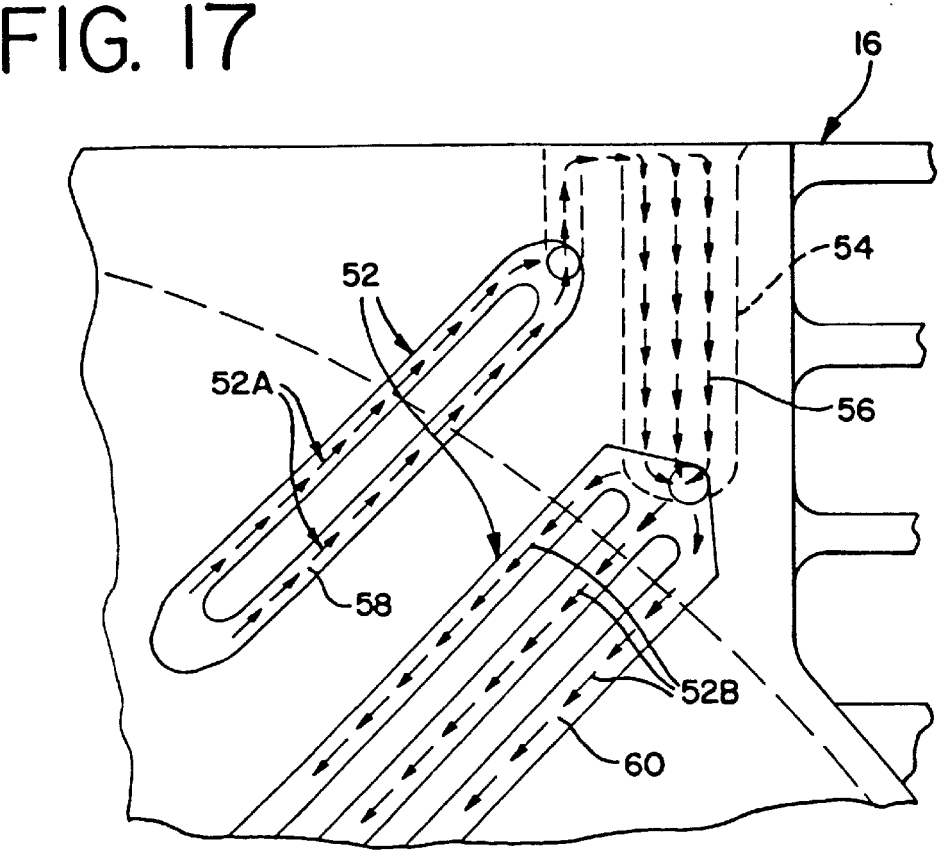
FIG. 17 is an enlarged fragmentary top view of a cover illustrating a tubular breather filter in dotted line and cast diffusion channels with arrows indicating airflow path of the high performance disk drive of FIG. 1.

Referring to FIGS. 14–16, the unique flow path for this tube filter 56 is depicted. The outlet from the tube is sealed to one wall of the DE 12 with a foam seal or foam tape 234.

At the outlet of filter 56, the downstream diffusion path into the file includes a channel 236 formed in the DE casting 12 and sealed with a mylar or copper tape 238. The channel 236 can be ported to an appropriate low pressure region in the disk drive 10. For example, in the disk drive 10 the breather filter 56 is ported close to the center of the spindle assembly 20 as shown in FIG. 1. At the inlet to the filter 56, the inlet diffusion path is formed similarly with a channel 240, sealed with a mylar or copper tape 238. Channel 240 is then ported to the outside of the file 10.

The tube breather filter 56 could be used more conventionally by attaching the inlet end to the DE casting. To insure the effectiveness of the chemical media 226, 228, 230, additional flanges (not shown) containing inlet and outlet diffusion paths could be added to the top and bottom of the tube. Breather filter 56 is simple to manufacture. The pieces of media can be punched and stuffed in the tube 54 or 220 using automated processes, and adhesive/ultrasonic welding of the media is not required.

Figure 22:
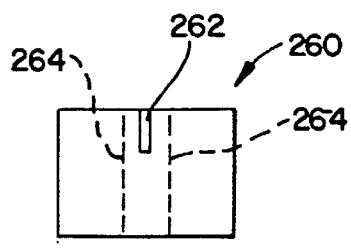
FIG. 22 is an end view of the twirler template of FIG. 20 with internal details shown in dotted line.
Figure 23:
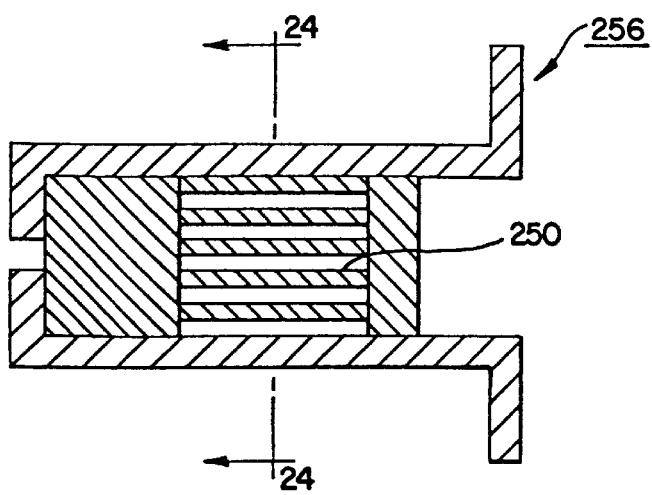
FIG. 23 is a sectional view of an alternative tube breather filter arranged in accordance with the invention.

Referring to FIGS. 22 and 23, a twirlpak generally designated 250 is shown as getter packing for an alternative long narrow breather filter 256. Long narrow filter 256 is one having a ratio of the dimension on the main axis of flow >2.0 times the smallest dimension perpendicular to the main axis of flow. Tube filter 56 is an example of a long narrow filter in which the media is contained in a cylinder which constitutes a gas flow channel.

Adjustment of the length and tightness of the twirled media 250 is used to meet desired filter specifications. Pressure drop of the filter 256 is determined by the length of and tightness of the twirlpak 250. Capacity is determined by the quantity of getter in the twirlpak 250. Getter is a medium capable of removing one or more contaminating substances from an airstream. Breakthrough performance is determined by both the length and tightness of the twirlpak 250.

The twirlpak 250 is prepared by rolling a strip of media around an axis which will become the axis of flow in the getter. Unlike conventional getter packings such as granular carbon, the amount of media in a twirlpak 250 can be varied by altering the compression achieved in the twirling operation. An example of the procedure for preparing a long narrow tube filter 256 using a twirlpak follows.

Figure 18:
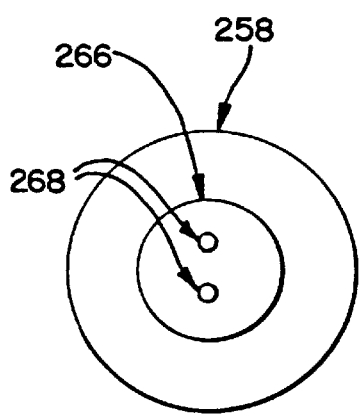
FIG. 18 is a top plan view of a twirler tool.
Figure 19:
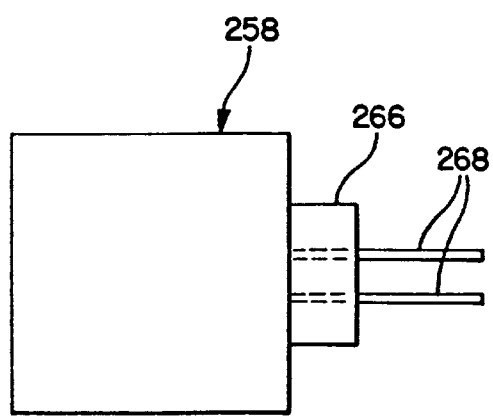
FIG. 19 is a side view of the twirler tool of FIG. 18.
Figure 20:
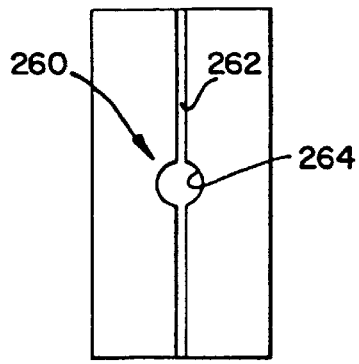
FIG. 20 is a top view of twirler template used with the twirler tool of FIGS. 18 and 19 for preparing a twirlpak getter for a breather filter.
Figure 21:
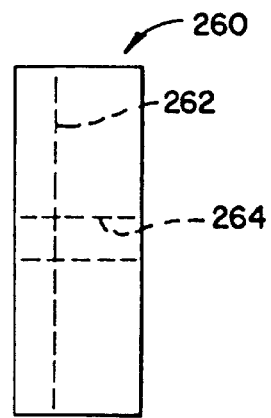
FIG. 21 is a side view of the twirler template of FIG. 20 with internal details shown in dotted line.
Figure 24:
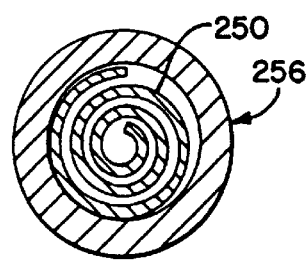
FIG. 24 is a sectional view taken along the line 24—24 of the alternative tube breather filter of FIG. 23.

A device comprised of a twirler 258 illustrated in FIGS. 18 and 19 and a twirling template 260 illustrated in FIGS. 20, 21 and 22 is utilized, which allows the getter media to be twirled and then inserted into the long narrow tube filter 256 without handling of the twirlpak 250. First a strip of getter media, e.g., carbon fabric, is cut so that the width is equal to the desired depth of getter in the tube filter 256. Next the length of the strip of getter media is selected to provide the desired degree of compaction of the media in the tube filter. The length is chosen to give about 75% volume filling of tube cavity. The twirling template 260 consists of a slot 262 and a cylindrical cavity 264 which has a diameter slightly smaller than that of the tube filter 256 shown in FIGS. 23 and 24. The strip of getter media is placed in the slot 262 of the twirling template 260. The relative position of the slot and the cylindrical cavity determine if the media is to be twirled in a single or double spiral. The twirler 258 is comprised of a shaft 266 with a diameter slightly smaller than the cylindrical cavity 264 of the twirling template 260. In this shaft 266 are mounted a pair of narrow pins 268 aligned parallel with the axis of the shaft 266. The spacing of the pins 268 allows them to just slide over the thickness of the getter medium as seen in FIG. 24. The axis of the twirler 258 and that of the cylindrical cavity 264 in the twirling template 260 are aligned, and the twirler 258 is inserted far enough into the twirling cavity 264 to allow the pins 268 to pass along the full width of the getter media strip. The twirler 258 is rotated on its axis to twirl the media strip into the twirlpak 250. The cylindrical cavity 264 of the twirling template 260 is then aligned with the tube filter 256, so that the axis of both are common. The twirlpak 250 is moved from the cylindrical cavity 264 of the twirling template 260 to the desired position in the tube filter 256. The ram used to move the twirlpak may be the shaft 266 of the twirler 258, or another properly-sized cylindrical shaft. If desired, the twirlpak 250 may be loaded into a cylindrical tool for subsequent transfer to the tube filter 256 in a separate operation. This may be of particular advantage if the twirlpak is to be loaded into a tube filter which is integral to a complex device. This might be desired in order to separate the operations of handling the carbon getter media from the final produce which will contain the tube filter.

Filters using the twirlpak, which is prepared and loaded in this manner met both breakthrough and pressure drop performance criteria. Breakthrough is the ratio of the contaminant concentration exiting a getter or chemical breather filter (CBF) to the contaminant concentration entering a getter or CBF.

A series of tests were carried out to directly compare the performance of tube breather filters. The pressure drop of each filter was measured using a flow of 30 cc/min of clean dry nitrogen. The pressure drop of the tube itself and gas lines were constant and were subtracted. These results are summarized in Table 1.

TABLE 1

Tube Breather Test Results
Tube Breather Getter Height = 6.5 mm Nominal

| Adsorbant Material | $T_{0.001}/T_{0.80}$ | Delta P at 30 cc/min (in H2O) | Meets projected lifetime | Meets pressure criteria |
|---|---|---|---|---|
| Act. carbon coated form | 0.78 | 0.055 | No | Yes |
| Act. carbon granules | 0.59 | 0.055 | No | Yes |
| Act. Carbon felt | 0.82 | 0.13 | Yes | No |
| Act. Carbon fabric | $\geq 0.82$* | 0.21 | Yes* | No |
| Act. carbon twirlpak | 0.80 | 0.06 | Yes | Yes |

As used in Table 1, $T_{0.001}/T_{0.80}$ is a measure of the effectiveness of contact of the airstream with the media. In the case of the foam, the contact was excellent, resulting in an excellent sharpness or large ratio, but the total capacity and lifetime were very low although the loading of carbon on the foam was reported by the manufacturer to be the maximum achievable. Delta P is the pressure drop across the two electrostatic particulate filters plus the adsorbant media. Delta P does not include the pressure drop across the diffusion channels. Projected lifetime is based on both the time to reach the clip level and criteria which are file specific. Clip level is the maximum level of breakthrough which will give the getter or CBF a desired performance level. Breakthrough was not tested for activated carbon fabric but would be expected to perform as well or better than activated carbon felt. *Projected data based on other results.

While the invention has been described with reference to details of the illustrated embodiments, these details are not intended to limit the scope of the invention as defined in the appended claims.

We claim:

1. A magnetic storage disk drive having a spindle which supports at least one disk having at least one magnetic disk surface to form a spindle assembly for rotation of said at least one disk surface about an axis and a rotary actuator which supports at least one magnetic transducer for movement about respective disk surfaces comprising:
   a disk drive enclosure including a base casting and a cover;
   said base casting having a mating face;
   said cover having a mating face for engaging said base mating face to define said disk drive enclosure for enclosing said spindle, said at least one disk surface, said at least one magnetic transducer and said actuator;
   a flexible cable coupled to a motor of said spindle within said disk drive enclosure and extending from the interior of said disk drive enclosure to the exterior of said disk drive enclosure; an electrical connector coupled to a distal end of the flexible cable;
   said base casting including a locational and retention cast pocket structure for locating and retaining said electrical connector and said flexible cable used for connecting to a planar electronics card located outside said disk drive enclosure;
   and a unitary connector retainer provided within said locational and retention cast pocket structure, said unitary connector retainer adapted to detachably support said electrical connector, a locating post formed on said unitary connector retainer, said locating post adapted to locate and engage a corresponding structure of said planar electronics card to facilitate positioning of said planer electronics card with said electrical connector within said unitary connector retainer.

2. A magnetic storage disk drive as recited in claim 1 wherein said unitary connector retainer receives said electrical connector and said flexible cable and includes retaining features received within cooperating recesses formed in said base casting locational and retention cast pocket structure; said electrical connector connected to said spindle motor via said flexible cable.

3. A magnetic storage disk drive as recited in claim 2 wherein said connector retainer is a one-piece box formed of electrically insulative material and including a hinged lid portion and wherein said locating post further comprises a registration post slidingly received within a cooperating aperture in said planar electronics card for positioning said electrical connector with said planar electronics card; said planar electronics card including a plurality of electrical pins for connection with said electrical connector.

4. A magnetic storage disk drive as recited in claim 3 wherein said cover includes features receiving a unitary bracket.

5. A magnetic storage disk drive as recited in claim 4 further includes a data cable and a data connector contained by said unitary bracket.

6. A magnetic storage disk drive as recited in claim 5 wherein said unitary bracket includes a unitary member having a forwardly portion extending through a feedthrough opening in said cover for positioning said data connector in operative relation to said planar electronics card.

7. A magnetic storage disk drive as recited in claim 6 wherein said forwardly portion defines positioning rails received within a pair of guide slots formed in the cover.

8. A magnetic storage disk drive as recited in claim 6 further includes a seal received within said feedthrough opening.

9. A magnetic storage disk drive as recited in claim 5 wherein said unitary bracket is a one piece folding part.

10. A magnetic storage disk drive as recited in claim 5 wherein said unitary bracket is formed of electrically insulative material.

* * * * *